United States Patent
Tomita et al.

(10) Patent No.: US 6,739,625 B2
(45) Date of Patent: May 25, 2004

(54) SEAT-BELT GUIDE ANCHOR

(75) Inventors: Hiroshi Tomita, Shiga (JP); Muneo Nishizawa, Shiga (JP)

(73) Assignee: Takata Corporation, Tokyo (JP)

( * ) Notice: Subject to any disclaimer, the term of this patent is extended or adjusted under 35 U.S.C. 154(b) by 13 days.

(21) Appl. No.: 10/180,457

(22) Filed: Jun. 27, 2002

(65) Prior Publication Data

US 2003/0015865 A1 Jan. 23, 2003

(30) Foreign Application Priority Data

Jul. 11, 2001 (JP) ........................................ 2001-210614
Jan. 11, 2002 (JP) ........................................ 2002-004815

(51) Int. Cl.⁷ ............................................ B60R 22/185
(52) U.S. Cl. ..................................... 280/808; 280/801.1
(58) Field of Search ............................. 280/808, 801.1, 280/804; 297/483

(56) References Cited

U.S. PATENT DOCUMENTS

| | | | | |
|---|---|---|---|---|
| 4,005,904 A | * | 2/1977 | Weman et al. | 297/483 |
| 4,102,020 A | * | 7/1978 | Lindblad | 24/164 |
| 4,682,791 A | * | 7/1987 | Ernst | 280/806 |
| 5,415,432 A | * | 5/1995 | Thomas | 280/808 |
| 5,673,936 A | * | 10/1997 | Mondel | 280/808 |
| 5,984,358 A | * | 11/1999 | Mar et al. | 280/808 |
| 6,250,684 B1 | * | 6/2001 | Gleason et al. | 280/808 |
| 6,439,609 B1 | * | 8/2002 | Smithson | 280/801.1 |

FOREIGN PATENT DOCUMENTS

| | | |
|---|---|---|
| DE | 27 41 297 | 3/1979 |
| DE | 30 08 371 | 9/1981 |
| EP | 0 760 316 | 3/1997 |
| GB | 2 020 541 | 11/1979 |
| JP | 5-44719 | 6/1993 |
| WO | 82/04400 | 12/1982 |

* cited by examiner

Primary Examiner—Charles T. Jordan
Assistant Examiner—Bret Hayes
(74) Attorney, Agent, or Firm—Kanesaka & Takeuchi

(57) ABSTRACT

A seat-belt guide anchor for guiding a seat belt in a vehicle includes an elongated guide hole through which the seat belt slides and a sliding portion disposed adjacent to the guide hole contacting the seat belt. The seat belt extends with an angle relative to a direction perpendicular to a long axis of the guide hole. The sliding portion has a projection or a recess. An end portion of the projection or recess extends and is inclined with an angle larger than the seat belt extension angle.

12 Claims, 10 Drawing Sheets

Fig. 6(a)
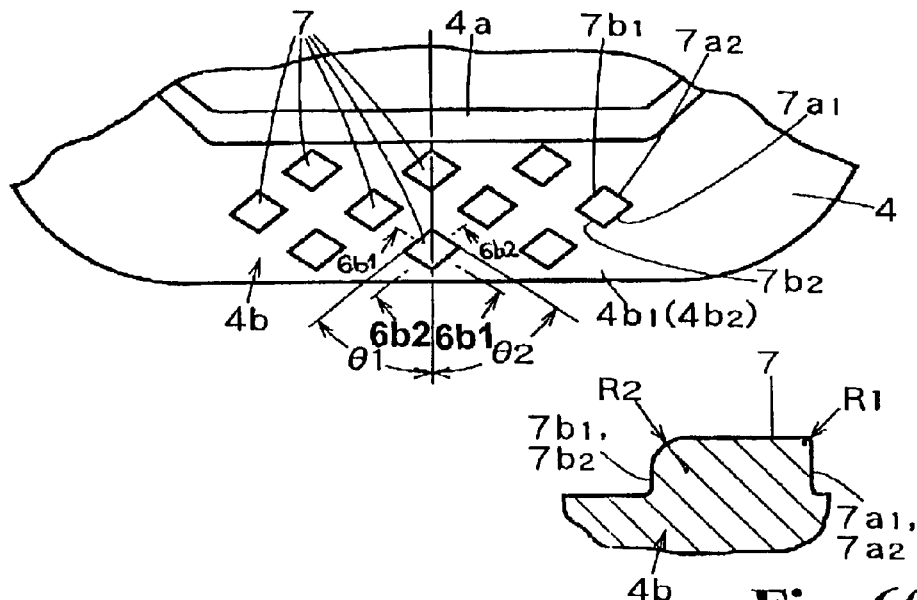
Fig. 6(b)
Fig. 7(a)
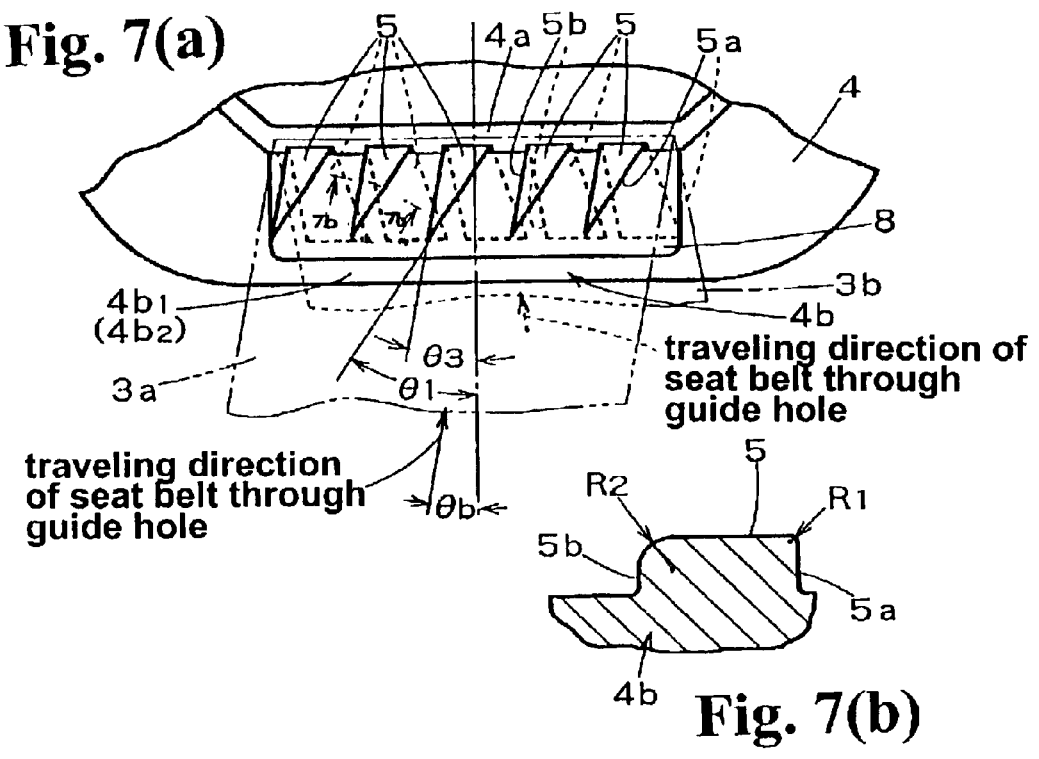
Fig. 7(b)

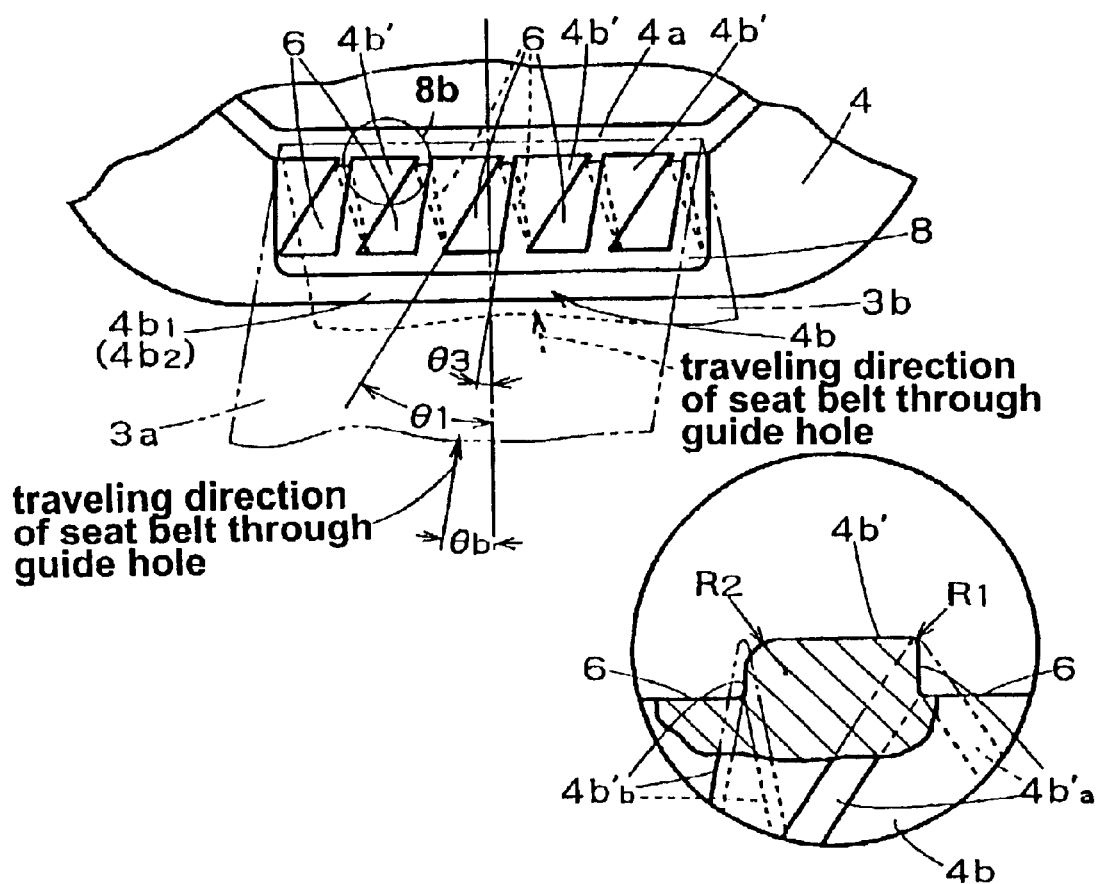

SEAT-BELT GUIDE ANCHOR

BACKGROUND OF THE INVENTION AND RELATED ART STATEMENT

The present invention relates to a seat-belt guide anchor that is supported on a vehicle body, for example, a pillar, and swings freely. The guide anchor guides a seat belt of a seat belt device, in which the seat belt slides through the anchor in a longitudinal direction thereof.

A seat belt device attached to a seat of a vehicle protects a passenger from injury due to a collision with a vehicle body or the like by restraining the passenger with a seat belt in the case of an emergency such as a vehicle collision.

Such a seat belt device is provided with a guide anchor that is supported on an inner wall of a vehicle body, for example, a pillar, and that has a belt guide hole for guiding the seat belt in a longitudinal direction thereof. In this case, in general, when the guide anchor is mounted on the vehicle body, the belt guide hole extends in forward and backward directions of the vehicle. The guide anchor allows the seat belt to restrain the passenger in a correct position.

In the guide anchor for the seat belt, when the seat belt is extracted at a relatively higher speed than a usual belt-extraction speed, for example, upon wearing the belt, it is sometimes biased to a front side end of the belt guide hole in a vehicle, as shown in FIG. 12. When the seat belt is biased to the vehicle's front side end of the belt guide hole, it does not smoothly slide through the belt guide hole, and moreover, sometimes it becomes troublesome to restore the seat belt.

Accordingly, in Japanese Utility Model Application No. 03-96565 (Japanese Utility Model Publication (KOKAI) No. 05-44719), hereinafter referred to as a "publication", it is disclosed that a guide anchor prevents a seat belt from being biased to one end of a belt guide hole. In the guide anchor disclosed in the publication, projections or recesses for preventing the bias of the seat belt are formed in a portion where the seat belt slides so that they are oriented in a traveling direction of the seat belt. The seat belt is prevented from being biased by the friction between these projections or recesses and the seat belt.

In the past, various types of seat belt devices have been developed in which, in the case of an emergency, such as a vehicle collision, a pretensioner is actuated to drive a retractor in a seat-belt winding direction, thereby winding the seat belt and increasing a restraining force of the seat belt for the passenger. Since the retractor rapidly winds the seat belt in response to the actuation of the pretensioner in such a seat belt device, the above-described bias problem can occur. Accordingly, it is possible to prevent the seat belt from being biased upon the actuation of the pretensioner by using the guide anchor disclosed in the above publication.

However, when the pretensioner is actuated, the seat belt is wound far more rapidly than in a situation disclosed in the above publication. For this reason, it is difficult to effectively prevent the seat belt from being biased with the projections or recesses oriented in the seat-belt traveling direction as disclosed in the above publication. Even when the guide anchor in the publication is used, the seat belt still may be biased.

Further, other types of seat belt devices have been developed in which an impact of a seat belt applied to the passenger and a load on the seat belt are reduced by an energy absorption mechanism (hereinafter also referred to as an "EA mechanism") that absorbs an impact energy to the seat belt when a retractor locks the withdrawal of the seat belt in the case of an emergency, such as a vehicle collision. The EA mechanism absorbs the impact energy by twisting a torsion bar provided in the retractor. In this case, the seat belt is drawn from the retractor by an amount corresponding to the torsion bar twist.

When the seat belt is drawn upon the EA mechanism being actuated, since it is drawn far more rapidly than in a normal operation, the above-described bias of the seat belt may occur. Accordingly, it is considered to use the guide anchor disclosed in the above publication to prevent the seat belt from being biased, in a manner similar to that in the above case in which the pretensioner is actuated.

However, since the seat belt is extracted far more rapidly than in a situation in the above publication when the EA mechanism is actuated, it is similarly difficult to effectively prevent the bias of the seat belt with the projections or recesses disclosed in the above publication.

As described above, it is difficult to effectively prevent the seat belt bias with the guide anchor disclosed in the above publication when the seat belt is rapidly extracted and is rapidly retracted in the case of an emergency, such as a vehicle collision.

The present invention has been made in view of such circumstances, and an object of the invention is to provide a seat-belt guide anchor that can more effectively and reliably prevent a seat belt from being biased when the seat belt is rapidly drawn and wound in the case of an emergency, such as a vehicle collision.

Further objects and advantages of the invention will be apparent from the following disclosure of the invention.

SUMMARY OF THE INVENTION

In order to solve the above problems, the first aspect of the invention provides a seat-belt guide anchor that is supported on a vehicle body, such as a pillar, and swings freely. The seat-belt guide anchor guides a seat belt while the seat belt travels through a belt guide hole so as to slide in a longitudinal direction thereof. A projection or a recess is formed in a sliding portion for the seat belt. A vehicle-rear side end of the projection or a vehicle-rear side end of the sliding portion forming the recess is inclined with respect to a direction perpendicular to the belt guide hole disposed in the sliding portion for the seat belt in a state in which the seat-belt guide anchor is mounted on the vehicle body. An angle of the inclination is set to be more than an inclination angle of a traveling direction of the seat belt through the belt guide hole with respect to the orthogonal direction.

The second aspect of the invention provides a seat-belt guide anchor that is supported on a vehicle body, such as a pillar, and swings freely. The seat-belt guide anchor guides a seat belt while the seat belt travels through a belt guide hole so as to slide in a longitudinal direction thereof. A projection or a recess is formed in a sliding portion for the seat belt. A vehicle-rear side end of the projection or a vehicle-rear side end of the sliding portion forming the recess is inclined with respect to a direction perpendicular to the belt guide hole disposed in the sliding portion for the seat belt in a state in which the seat-belt guide anchor is mounted on the vehicle body. An angle of the inclination is set to be smaller than an inclination angle of a traveling direction of the seat belt through the belt guide hole with respect to the orthogonal direction, or opposite with respect to the orthogonal direction.

Further, in the third aspect of the invention, a projection is formed in a rib shape, and a recess is formed in a concave groove shape.

The fourth aspect of the invention provides a seat-belt guide anchor that is supported on a vehicle body, such as a pillar, and swings freely. The seat-belt guide anchor guides a seat belt while the seat belt travels through a belt guide hole so as to slide in a longitudinal direction thereof. A plurality of projections or recesses is formed in a sliding portion for the seat belt. Vehicle-rear side ends of the projections or vehicle-rear side ends of the recesses include the first vehicle-rear side end and the second vehicle-rear side end in a state in which the seat-belt guide anchor is mounted on the vehicle body. The first vehicle-rear side end is inclined with respect to a direction perpendicular to the belt guide hole disposed in the sliding portion for the seat belt. An angle of the inclination is set to be more than an inclination angle of a traveling direction of the seat belt through the belt guide hole with respect to the orthogonal direction. The second vehicle-rear side end is inclined with respect to a direction perpendicular to the belt guide hole disposed in the sliding portion for the seat belt, and the angle of the inclination is set to be less than the inclination angle of the traveling direction of the seat belt through the belt guide hole with respect to the orthogonal direction, or opposite to the orthogonal direction.

In the fifth aspect of the invention, the vehicle-rear side end of the projection or the vehicle-rear side end of the sliding portion forming the recess is formed of a round portion having a small diameter or of an edge portion.

Further, in the sixth aspect of the invention, the vehicle-front side end of the projection or the vehicle-front side end of the sliding portion forming the recess is formed of a round portion having a large diameter or of a chamfered portion.

In the seventh aspect of the invention, the vehicle-front side end of the projection or the vehicle-front side end of the sliding portion forming the recess extends in the traveling direction of the seat belt through the belt guide hole.

Further, in the eighth aspect of the invention, the vehicle-front side end of the projection or the vehicle-front side end of the sliding portion forming the recess is formed in a stepped shape. The stepped portion is formed of predetermined combinations of the first vehicle-front side end portions parallel to the traveling direction of the seat belt through the belt guide hole, and the second vehicle-front side end portions perpendicular to the first vehicle-front side end portions.

In the first aspect of the invention, when the seat belt is rapidly wound, for example, in response to the pretensioner in the case of an emergency such as a vehicle collision, the seat belt is restrained from moving toward the vehicle front side by the vehicle-rear side projection end or the vehicle-rear side end of the seat-belt sliding portion forming the recess. This makes it possible to more effectively and reliably prevent the seat belt from being biased toward the vehicle front side. The seat-belt guide anchor is particularly suitable for the seat belt device having the pretensioner.

In the second aspect of the invention, when the seat belt is drawn while absorbing the impact energy, for example, in response to the EA mechanism in the case of an emergency such as a vehicle collision, the seat belt is restrained from moving toward the vehicle front side by the vehicle-rear side projection end or the vehicle-rear side end of the seat-belt sliding portion forming the recess. This makes it possible to more effectively and reliably prevent the seat belt from being biased toward the vehicle front side. The seat-belt guide anchor is particularly suitable for the seat belt device without the pretensioner, but with the EA mechanism.

Further, in the third aspect of the invention, since the projection is formed in the rib shape and the recess is formed in the concave groove shape, the structure is simplified to facilitate production.

In the fourth aspect of the invention, when the seat belt is rapidly wound, for example, in response to the pretensioner in the case of an emergency such as a vehicle collision, the seat belt is restrained from moving toward the vehicle front side by the first vehicle-rear side projection ends or the first vehicle-rear side ends of the seat-belt sliding portion forming the recesses. Furthermore, when the seat belt is drawn while absorbing the impact energy, for example, in response to the EA mechanism in the case of an emergency such as a vehicle collision, the seat belt is restrained from moving toward the vehicle front side by the second vehicle-rear side projection ends or the second vehicle-rear side ends of the seat-belt sliding portion forming the recesses. This makes it possible to more effectively and reliably prevent the seat belt from being biased toward the vehicle front side. The seat-belt guide anchor is particularly suitable for the seat belt device with at least one of the pretensioner and the EA mechanism.

In the fifth aspect of the invention, since the vehicle-rear side end of the projection or the vehicle-rear side end of the sliding portion forming the recess is formed of the round portion having the small diameter and the edge portion, the seat belt is inhibited more effectively from moving toward the vehicle front side by the frictional reactive force between the vehicle-rear side end and the seat belt produced from the vehicle-rear side end.

In the sixth aspect of the invention, since the vehicle-front side end of the projection or the vehicle-front side end of the sliding portion forming the recess is formed of the round portion having the large diameter or the chamfered portion, little friction occurs between the vehicle-front side end and the seat belt, and the seat belt is inhibited from moving toward the vehicle front side due to the vehicle-front side end.

In the seventh aspect of the invention, since the vehicle-front side end of the projection or the vehicle-front side end of the sliding portion forming the recess extends in the traveling direction of the seat belt through the belt guide hole, little friction occurs between the vehicle-front side end and the seat belt, and the seat belt is inhibited from moving toward the vehicle front side due to the vehicle-front side end.

In the eighth aspect of the invention, since the vehicle-front side projection end or the vehicle-front side end of the sliding portion forming the recess is formed in the stepped shape by predetermined combinations of the first vehicle-front side end portions parallel to the traveling direction of the seat belt through the belt guide hole and the second vehicle-front side end portions perpendicular to the first vehicle-front side end portions, a force for moving the seat belt toward the vehicle front side is not produced by the vehicle-front side end. Therefore, when the seat belt is drawn, the turning of the guide anchor is inhibited, and the movement of the seat belt toward the vehicle front side is inhibited.

BRIEF DESCRIPTION OF THE DRAWINGS

FIGS. 1(a), 1(b), and 1(c) show a seat-belt guide anchor according to an embodiment of the present invention, wherein FIG. 1(a) is a view showing the seat-belt guide anchor, FIG. 1(b) is an enlarged view showing a section 1b in FIG. 1(a), and FIG. 1(c) is an enlarged view showing a modification of the section 1b in FIG. 1(a);

FIGS. 2(a) and 2(b) show an operation of the seat-belt guide anchor, wherein FIG. 2(a) is an explanatory view showing a state that a pretensioner is actuated, and FIG. 2(b) is an explanatory view showing a state that an EA mechanism is actuated;

FIGS. 4(a) and 4(b) show a seat-belt guide anchor according to an embodiment of the present invention, wherein FIG. 4(a) is a partial front view of the seat-belt guide anchor, and FIG. 4(b) is a partially enlarged view of a section 4b in FIG. 4(a);

FIGS. 6(a) and 6(b) show a seat-belt guide anchor according to an embodiment of the present invention, wherein FIG. 6(a) is a partial front view of the seat-belt guide anchor, and FIG. 6(b) is a partially enlarged sectional view taken along line 6b1—6b1, which is the same as 6b2—6b2, in FIG. 6(a);

FIGS. 7(a) and 7(b) show a seat-belt guide anchor according to an embodiment of the present invention, wherein FIG. 7(a) is a partial front view of the seat-belt guide anchor, and FIG. 7(b) is a partially enlarged sectional view taken along line 7b—7b in FIG. 7(a);

FIGS. 8(a) and 8(b) show a seat-belt guide anchor according to an embodiment of the present invention, wherein FIG. 8(a) is a partial front view of the seat-belt guide anchor, and FIG. 8(b) is a partially enlarged view of a section 8b in FIG. 8(a);

FIGS. 9(a) and 9(b) show a seat-belt guide anchor according to an embodiment of the present invention, wherein FIG. 9(a) is a partial front view of the seat-belt guide anchor, and FIG. 9(b) is a partially enlarged sectional view taken along lines 9b1—9b1, which is the same as 9b2—9b2, in FIG. 9(a);

FIGS. 10(a), 10(b) and 10(c) show a seat-belt guide anchor according to an embodiment of the present invention, wherein FIG. 10(a) is a partial front view of the seat-belt guide anchor, FIG. 10(b) is a partially enlarged sectional view taken along line 10b—10b in FIG. 10(a), and FIG. 10(c) is a partially enlarged sectional view taken along line 10c—10c in FIG. 10(a);

FIGS. 11(a), 11(b) and 11(c) show a seat-belt guide anchor according to an embodiment of the present invention, wherein FIG. 11(a) is a partial plan of the seat-belt guide anchor, FIG. 11(b) is a partially enlarged sectional view taken along line 11b—11b in FIG. 11(a), and FIG. 11(c) is a partially enlarged sectional view taken along line 11c—11c in FIG. 11(a)

DETAILED DESCRIPTION OF THE PREFERRED EMBODIMENTS

Hereunder, embodiments of the present invention will be explained with reference to the accompanied drawings.

Figure 1A:
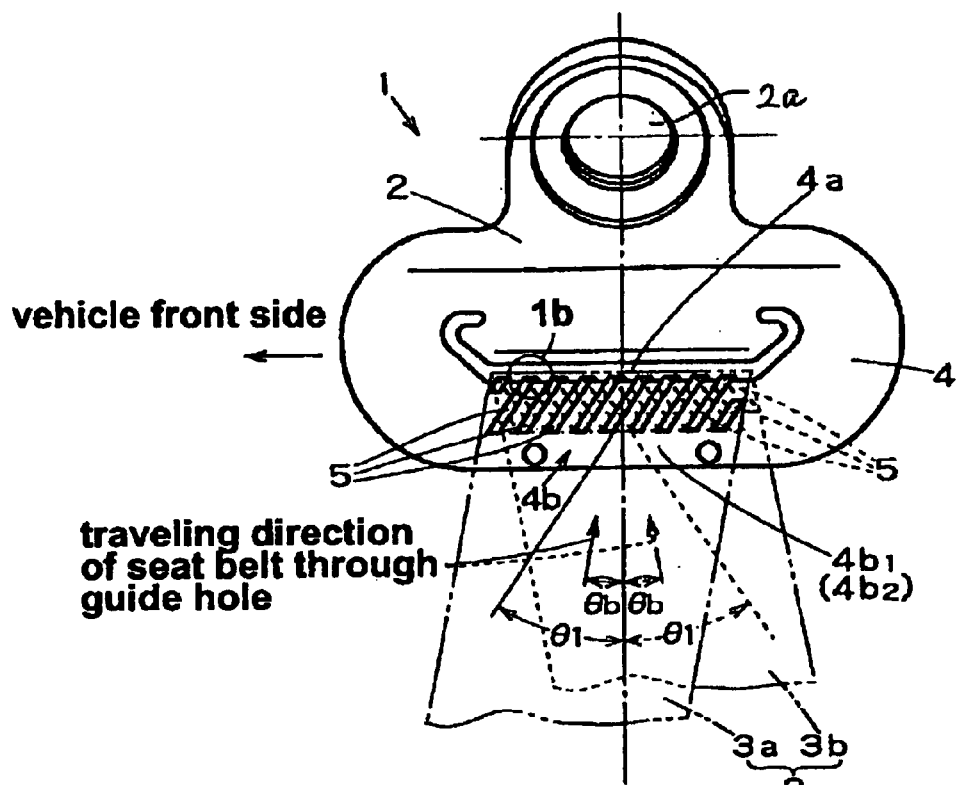
Figures 1B, 1C:
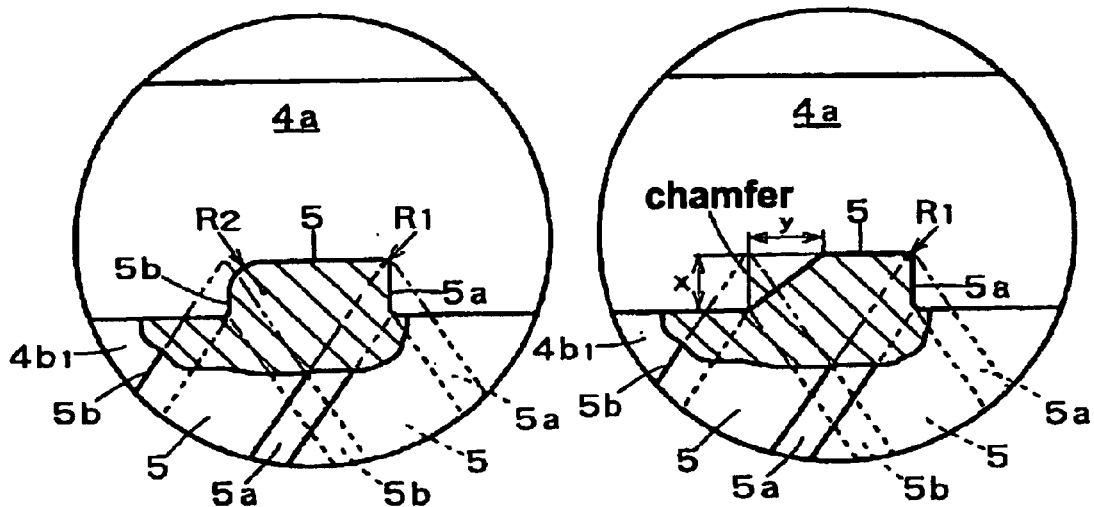

FIGS. 1(a) and 1(b) show a seat-belt guide anchor according to the first embodiment of the present invention. FIG. 1(a) is a front view of the guide anchor of the first embodiment, and FIG. 1(b) is a partially enlarged sectional view of a portion 1b in FIG. 1(a).

As shown in FIG. 1(a), a seat-belt guide anchor 1 of the first embodiment comprises a mounting section 2 having a mounting hole 2a, through which a fastener, such as a bolt, passes, for mounting the guide anchor 1 to a vehicle body, and a belt guide section 4 having a belt guide hole 4a for guiding a seat belt 3 to pass therethrough. The mounting section 2 and the belt guide section 4 are formed in a bent shape so that they form a predetermined angle relative to each other. The guide anchor 1 may be made of only a resin, may be formed by attaching the belt guide section 4 separately made of a resin or a metal as a supporting member and molded together, or may be made of only a metal.

As shown in FIG. 1(a), a predetermined number of (ten in this case) ribs (corresponding to projections in the present invention) 5 with a fixed width is formed on a sliding portion 4b for the seat belt 3 in the belt guide section 4 including the belt guide hole 4a. These ribs 5 are formed in series from a sliding portion 4b1 in which a passenger-side portion of the seat belt 3 slides (a front side in the figure) to a sliding portion 4b2 in which a retractor-side portion of the seat belt 3 slides (a rear side in the figure). The ribs 5 at the right and left ends are not always formed on both sides 4b1 and 4b2 of the sliding portion 4b outside a sliding area of the seat belt 3.

In each of the ribs 5, a portion at a side of the sliding portion 4b1 (a portion shown by a solid line in the figure) is inclined downward extending toward a vehicle front side, and a portion at a side of the sliding portion 4b2 (a portion shown by a dotted line in the figure) is inclined downward extending toward a vehicle rear side. The guide anchor 1 of the first embodiment is designed to suit particularly for a seat belt device in which a retractor winds up the seat belt 3 by a predetermined amount in response to a pretensioner in the case of an emergency. In the case of a seat belt device in which an EA mechanism is actuated after a pretensioner is actuated in the emergency, various experiments have demonstrated that the seat belt 3 is rarely biased upon the actuation of the EA mechanism when it is not biased upon the actuation of the pretensioner. Therefore, the guide anchor 1 of the first embodiment is also suitable for such a seat belt device. The guide anchor 1 of the first embodiment is, of course, also suitable for a seat belt device that does not have a pretensioner and an EA mechanism.

An inclination angle θ1 of the ribs 5 formed at a side of the sliding portion 4b1 with respect to a vertical direction in FIG. 1(a), which is a direction perpendicular to the belt guide hole 4a positioned in the sliding portion 4b1 for the seat belt 3, is set to be an angle larger than an inclination angle θb of a traveling direction the passenger-side portion 3a of the seat belt 3 sliding through the belt guide hole 4a (shown by a solid arrow in the figure) with respect to the vertical direction in the figure (an inclination angle of a longitudinal direction of the passenger-side portion 3a of the seat belt 3 with respect to the vertical direction in the figure). The inclination angle θb also corresponds to an inclination angle of a drawing direction of the seat belt 3 by the EA operation.

Similarly, an inclination angle θ1 of the ribs 5 formed at a side of the sliding portion 4b2 with respect to a vertical direction in FIG. 1(a) is set to be an angle larger than an inclination angle θb of a traveling direction the retractor-side portion 3b of the seat belt 3 sliding through the belt guide hole 4a (shown by a dashed arrow in the figure) with respect to the vertical direction in the figure (an inclination angle of a longitudinal direction of the retractor-side portion 3b of the seat belt 3 with respect to the vertical direction in the figure) Both the angles θ1 and θb are expressed in absolute values. This also applies to all angles shown in the following other embodiments.

Figure 2A:
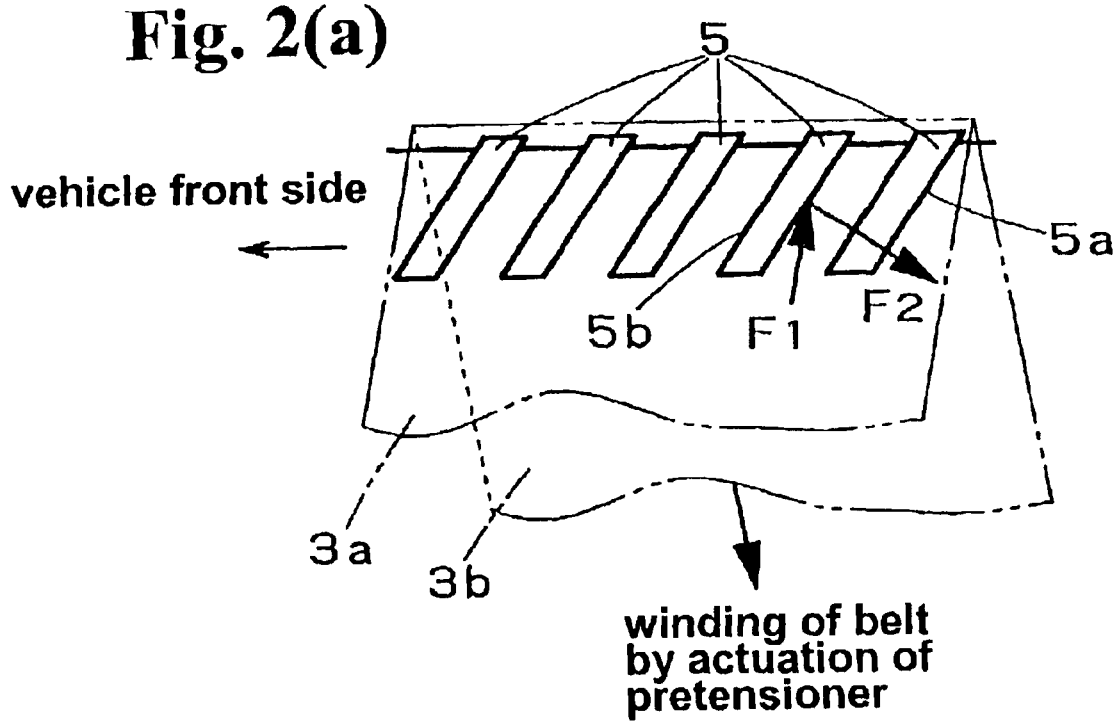

The predetermined angle is set such that, when the seat belt is wound by the pretensioner, in the sliding portion 4b1, a force F1, which is applied from the passenger-side portion 3a of the seat belt 3 to the vehicle-rear side ends 5a, of the ribs 5, is generated by friction between the passenger-side portion 3a of the seat belt 3 and the vehicle-rear side ends 5a of the ribs 5a, and, as shown in FIG. 2(a), a reactive force F2, which acts on the passenger-side portion 3a of the seat belt 3 so as not to move the seat belt 3 to the vehicle front side (leftward in the figure), is produced. This also applies to the sliding portion 4b2. Note that in FIG. 2(a) the arrows of the forces F1 and F2 represent only directions of the forces F1 and F2, and do not represent a magnitude of the forces F1 and F2.

As shown in FIG. 1(b), the vehicle-rear side end 5a of the rib 5 is formed of a round portion having a small diameter R1 (a round edge), or of an edge portion (a sharp edge). The small diameter R1 is determined so that the above-described reactive force F2, which is not large enough to move the seat belt 3 to the vehicle front side, reliably acts on the seat belt 3. A vehicle-front side end 5b of the rib 5 is formed of a round portion having a relatively large diameter R2 greater than R1. As shown in FIG. 1(c), the vehicle-front side end 5b of the rib 5 may be formed of a chamfered portion chamfered along the sides x and y, instead of the round portion having a relatively large diameter R2.

Figure 2B:
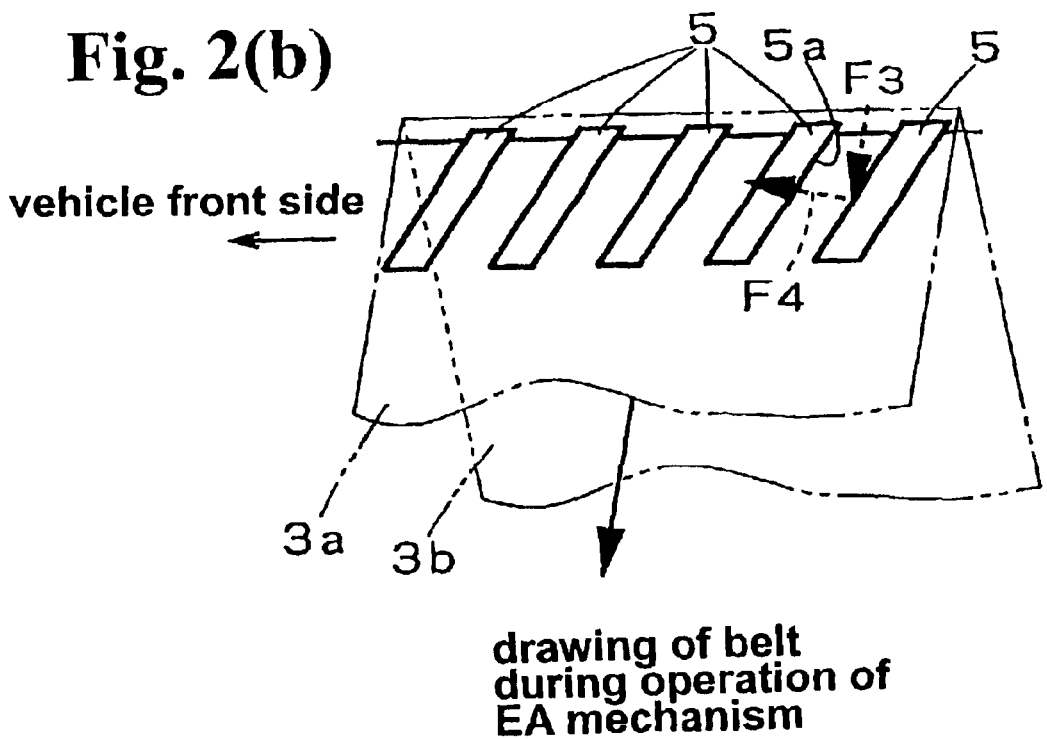

The large diameter R2 or the chamfering is determined so that little friction occurs between the seat belt 3 and the vehicle-front side end 5b of the rib 5 when the belt is drawn in response to the EA mechanism, as shown in FIG. 2(b). In other words, the force F3 that the seat belt 3 exerts on the vehicle-front side end 5b of the rib 5, is rarely produced (while the force F3 is shown by a dotted line in the figure, it is virtually shown only for convenience of explanation). Further, a reactive force, which acts on the seat belt 3 so as to move the seat belt 3 to the vehicle front side (leftward in the figure), is not produced (substantially, to a degree to which little reactive force arises) (while the reactive force F4 is shown by a dotted line in the figure, it is virtually shown only for explanation).

In the chamfered portion shown in FIG. 1(c), as the side y becomes longer than the side x, it is more difficult for the seat belt 3 to be caught by the vehicle-front side end 5b of the rib 5 during the operation of the EA mechanism. That is, less friction is produced between the seat belt 3 and the vehicle-front side end 5b of the rib 5. Therefore, it is preferable that the side y be set to be longer than the side x. Although the chamfered portion shown in FIG. 1(c) is formed so that the vehicle-front side end 5b is completely removed, it may be formed so that a part of the vehicle-front side end 5b remains.

In the guide anchor 1 of the first embodiment having the configuration as described above, when a pretensioner is actuated in the case of an emergency and the seat belt 3 is rapidly wound, the seat belt 3 is inhibited by the reactive force F2 from the ribs 5 from moving toward the vehicle-front side end of the guide hole 4a, as shown in FIG. 2(a). This makes it possible to more effectively and reliably prevent the seat belt 3 from being biased to the vehicle front side when being rapidly wound by the pretensioner.

Even in the case in which the seat belt 3 is drawn more rapidly than in a usual operation, as disclosed in the above publication, the seat belt 3 is still inhibited by the reactive force F2 from moving toward the vehicle-front side end of the guide hole 4a.

In the guide anchor 1 of the first embodiment, in case the retractor has the EA mechanism, little friction is produced between the seat belt 3 and the vehicle-front side ends 5b of the ribs 5 when the seat belt 3 is drawn during the operation of the EA mechanism in the case of an emergency. Also, little reactive force to the force F3 which is applied to the seat belt 3 on the vehicle-front side ends 5b of the ribs 5 is produced by the friction, as described above. Therefore, even when the ribs 5 are formed, the force for moving the seat belt 3 toward the vehicle front side is hardly produced from the ribs 5, the seat belt 3 is smoothly retracted by the actuation of the EA mechanism of the seat belt 3, and the energy is absorbed more reliably.

Figure 3:
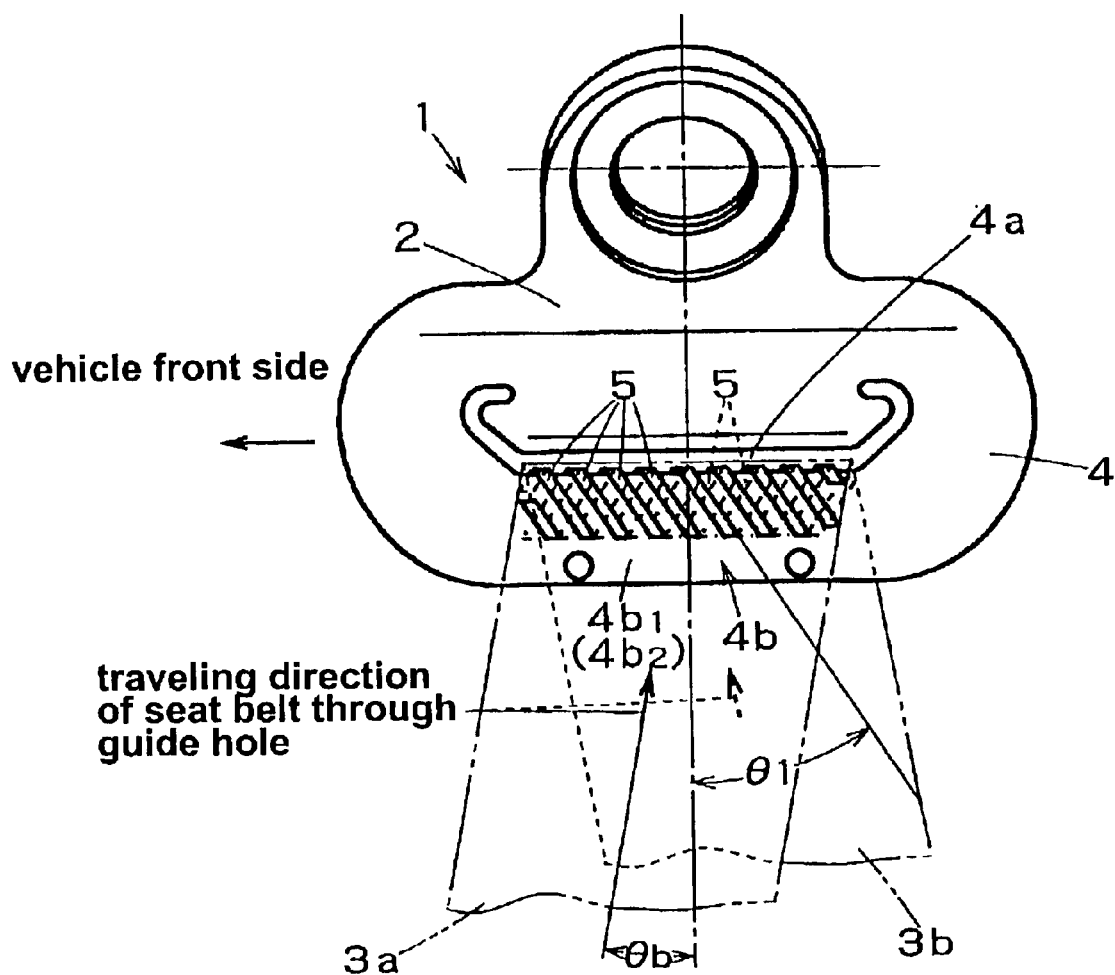
FIG. 3 is a view showing a seat-belt guide anchor according to an embodiment of the present invention.

FIG. 3 is a view showing a guide anchor according to the second embodiment of the present invention, similarly to FIG. 1(a).

As shown in FIG. 3, in a guide anchor 1 of the second embodiment, ribs 5 are formed to be inclined in a direction opposite to the ribs 5 of the guide anchor 1 in the first embodiment in the vertical direction in the figure, and are in line symmetry with the ribs 5 of the first embodiment. That is, in the second embodiment, an inclination angle $\theta 1$ of the ribs 5 relative to the vertical direction in the figure is set to be equal to the inclination angle $\theta 1$ of the ribs 5 in the first embodiment. The inclination angle $\theta 1$ of the ribs 5 in the second embodiment may be set to be different from the inclination angle $\theta 1$ of the ribs 5 in the above first embodiment.

Other structural features of the second embodiment are the same as those in the first embodiment. The guide anchor 1 of the second embodiment is suitable particularly for a seat belt device without the pretensioner, and the seat belt 3 is drawn by a predetermined amount by the EA mechanism in the case of an emergency. The guide anchor 1 of the second embodiment is also suitable for a seat belt device without both the pretensioner and the EA mechanism.

In the guide anchor 1 of the second embodiment having such a configuration, when the seat belt 3 is drawn by the EA, the friction between the vehicle-rear side ends 5a of the ribs 5 and the seat belt 3 generates a force of the seat belt 3 (corresponding to the force F1) on the vehicle-rear side ends 5a of the ribs 5, in a manner similar to that in the first embodiment. Further, a reactive force thereto (corresponding to the reactive force F2) prevents the seat belt 3 from moving toward the vehicle front side.

Since little friction is caused between the vehicle-front side ends 5b of the ribs 5 and the seat belt 3 when the seat belt 3 is wound, little friction is caused between the vehicle-rear side ends 5a of the ribs 5 and the seat belt 3, in a manner similar to that in the first embodiment. Therefore, the seat belt 3 exerts little force (corresponding to the force F3) on the vehicle-rear side ends 5a of the ribs 5 due to the friction, and a reactive force thereto (corresponding to the reactive force F4), that is, the force for moving the seat belt 3 toward the vehicle front side, is not produced.

Other effects of the guide anchor 1 of the second embodiment are substantially the same as those in first embodiment.

The ribs 5 in the second embodiment are not necessarily inclined in line symmetry with and in the direction opposite to that in the first embodiment. It is satisfactory as long as the extending direction of the ribs 5 formed in a sliding portion 4b1 is shifted counterclockwise by a predetermined angle from the traveling direction of the seat belt 3 through the belt guide hole. That is, it is satisfactory as long as the inclination angle of the vehicle-rear side ends 5a of the ribs 5 is set to be smaller than the inclination angle $\theta b$ of the traveling direction of the seat belt 3 through belt guide hole with respect to the vertical direction in the figure. Alternatively, it is satisfactory as long as the direction of the inclination is opposite with respect to the vertical direction.

The traveling direction of the seat belt 3 through the belt guide hole is different from that in the first embodiment, but is the same as the drawing direction of the seat belt 3 by the EA.

Figure 4A:
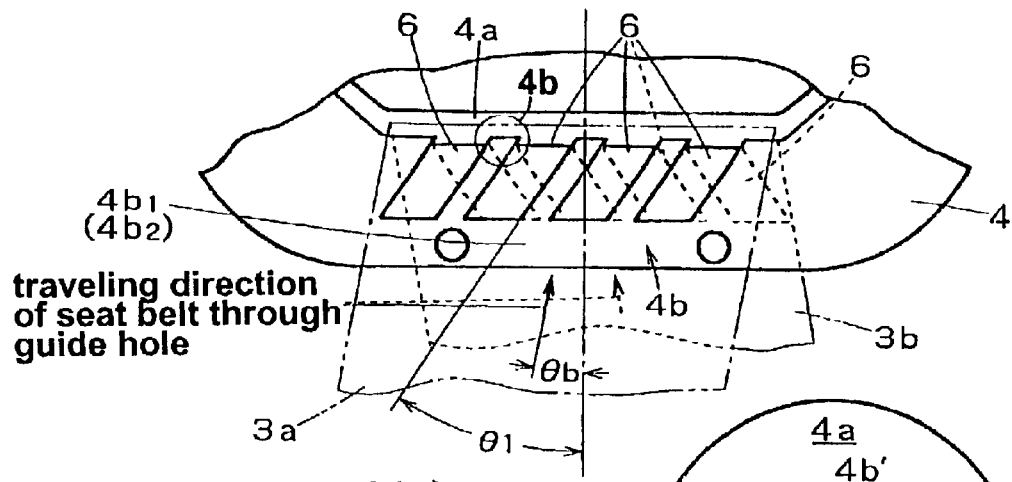
Figure 4B:
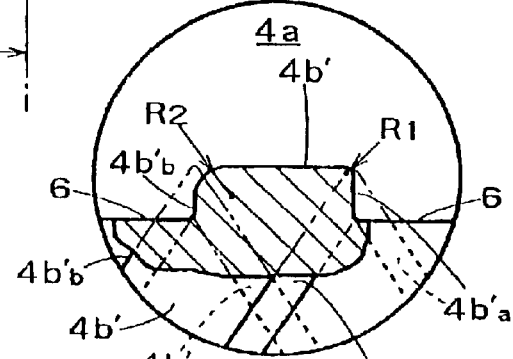

FIGS. 4(a) and 4(b) show a guide anchor according to the third embodiment of the present invention. FIG. 4(a) is a partial view of the guide anchor shown in a manner similar to that in FIG. 1(a), and FIG. 4(b) is a partially enlarged view of a section 4b in FIG. 4(a).

As shown in FIG. 4(a), in a guide anchor 1 of the third embodiment, a seat-belt sliding portion 4b is provided with a predetermined number of concaves or grooves (corresponding to the recesses in the present invention) 6, instead of the ribs 5, inclined in a manner similar to the ribs 5 in the first embodiment. As shown in FIG. 4(b), a vehicle-rear side end 4b'a of the seat-belt sliding portion 4b forming the concave groove 6 is fanned of a round portion having a small diameter R1 or of an edge portion, in a manner similar to that of the vehicle-rear side end 5a of the rib 5 in the first embodiment. A vehicle-front side end 4b'b of the seat-belt sliding portion 4b' forming the concave groove 6 is formed of a round portion having a large diameter R2 in a manner similar to that of the vehicle-front side end 5b of the rib 5 in the first embodiment, or of a chamfered portion (not shown) similar to that in the first embodiment.

Other structural features of the guide anchor 1 of the third embodiment are the same as those in the first embodiment. In the guide anchor 1 of the third embodiment having such a configuration, the seat belt sliding portion 4b' having the concave grooves 6 has the same functions as those of the ribs 5 in the first embodiment. Therefore, the guide anchor 1 of the third embodiment provides advantages similar to those of the first embodiment.

The guide anchor 1 of the third embodiment is suitable particularly for a seat belt device in which the seat belt is wound by the pretensioner, in a manner similar to that in the first embodiment. For a seat belt device without the pretensioner and with the EA mechanism, the inclination direction of the concave grooves 6 is opposite to that in the third embodiment, in a manner similar to that in the second embodiment shown in FIG. 3.

Figure 5:
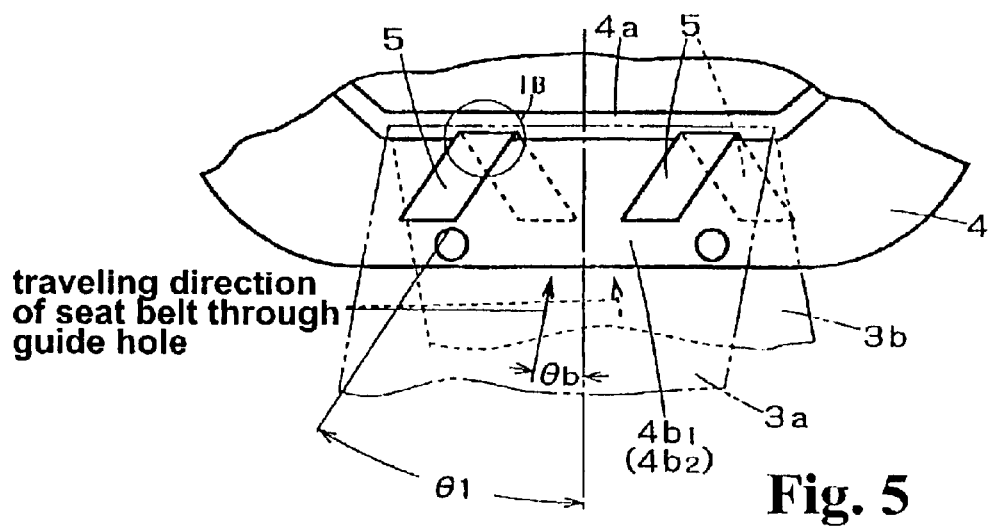
FIG. 5 is a partial front view showing a seat-belt guide anchor according to an embodiment of the present invention.

FIG. 5 is a partial view, similar to FIG. 4(a), showing a guide anchor according to the fourth embodiment of the present invention. As shown in FIG. 5, in a guide anchor 1 of the fourth embodiment, a small number of ribs 5 less than that of the ribs 5 in the first embodiment (two in the illustration) is formed in a seat-belt sliding portion 4b. The interval between the ribs 5 is set to be larger than that of the ribs 5 in the first embodiment.

Other structural features of the guide anchor 1 of the fourth embodiment are the same as those in the first embodiment. Also, operational effects of the guide anchor 1 of the fourth embodiment are substantially the same as those in the first embodiment.

The guide anchor 1 of the fourth embodiment is suitable particularly for a seat belt device in which a seat belt is wound by a pretensioner, in a manner similar to that in the guide anchor 1 of the first embodiment. For a seat belt device without a pretensioner, but with an EA mechanism, the inclination direction of the ribs 5 is opposite to that in the first embodiment, in a manner similar to that in the second embodiment shown in FIG. 3.

FIGS. 6(a) and 6(b) show a guide anchor according to the fifth embodiment of the present invention. FIG. 6(a) is a partial view similar to FIG. 4(a), and FIG. 6(b) is a partially enlarged sectional view taken along line $6b1$—$6b1$, which is the same as $6b2$—$6b2$, in FIG. 6(a).

As shown in FIG. 6(a), in the guide anchor 1 of the fifth embodiment, a seat-belt sliding portion 4b is provided with a predetermined number of parallelogram projections 7, corresponding to the projections in the present invention, formed of overlapping portions of the ribs 5 of the first embodiment shown in FIG. 1(a) and the ribs 5 of the second embodiment shown in FIG. 3 (the inclination angle θ1 is not equal to the inclination angle θ2 in this case). When the inclination angle θ1 is equal to the inclination angle θ2, the projections 7 are rhombic.

As shown in FIG. 6(b), vehicle-rear side ends $7a1$ and $7a2$ of the projections 7 in the fifth embodiment (respectively corresponding to the first vehicle-rear side end and the second vehicle-rear side end in the present invention) are both formed of a round portion having a small diameter R1 or of an edge portion, in a manner similar to that in the first embodiment. Vehicle-front side ends $7b1$ and $7b2$ of the projections 7 are both formed of a round portion having a large diameter R2, or of a chamfered portion in a manner similar to that in the first embodiment. The vehicle-rear side ends $7a1$ have operational effects substantially similar to those of the vehicle-rear side ends 5a in the first embodiment, and the vehicle-rear side ends $7a2$ have operational effects substantially similar to those of the vehicle-rear side ends 5a in the second embodiment. The vehicle-front side ends $7b1$ have operational effects substantially similar to those of the vehicle-front side ends 5b in the first embodiment, and the vehicle-front side ends $7b2$ have operational effects substantially similar to those of the vehicle-front side ends 5b in the second embodiment. While the projections 7 are formed on a front side of the sliding portion 4b of the seat belt 3 in FIG. 6(a), the projections 7 are also formed on a backside of the sliding portion 4b of the seat belt 3.

Other structural features of the guide anchor 1 of the fifth embodiment are similar to those in the first embodiment. The operational effects of the guide anchor 1 of the fifth embodiment correspond to a combination of those of the guide anchor 1 of the first embodiment and the second embodiment. Therefore, the guide anchor 1 of the fifth embodiment is suitable particularly for a seat belt device that has at least one of a pretensioner and an EA mechanism. Other operational effects of the guide anchor 1 of the fifth embodiment are similar to those in the first embodiment and the second embodiment.

While multiple projections 7 are aligned along the ribs 5 in the first embodiment and the second embodiment, they need not be always aligned, but may be arranged at random.

Instead of the projections 7 in the guide anchor 1 in the fifth embodiment, parallelogram recesses having a shape similar to those of the projections 7 may be arranged with the projections 7, in a manner similar to that in the concave grooves of the third embodiment. In this case, each side of the parallelogram projections 7 needs to be made relatively long in order to prevent the seat belt 3 from being biased more effectively. In this case, the vehicle-rear side ends of the sliding portions 4b forming the recesses are formed of a round portion having a small diameter R1 or of an edge portion. The vehicle-front side end of the sliding portion 4b forming the recess is formed of a round portion having a large diameter R2, in a manner similar to that in the concave groove of the third embodiment.

FIGS. 7(a) and 7(b) show a guide anchor according to the sixth embodiment of the present invention. FIG. 7(a) is a partial view similar to FIG. 4(a), and FIG. 7(b) is a partially enlarged sectional view, taken along a line 7b—7b in FIG. 7(a).

As shown in FIG. 7(a), in a guide anchor 1 of the sixth embodiment, a guide piece 8 having ribs 5 and made of, for example, Cr is mounted on a belt sliding portion 4b. In the ribs 5 of the sixth embodiment, the inclination angle θ1 of vehicle-rear side end 5a of the rib 5 in the sixth embodiment shown in FIG. 7(a) is set to be larger than the inclination angle θb of the traveling direction of the seat belt 3 through the belt guide hole. That is the drawing direction of the seat belt 3 by the EA operation, in a manner similar to that in the first embodiment. The inclination angle θ3 of vehicle-front side end 5b of the rib 5 in the sixth embodiment is set to be equal to the inclination angle θb of the traveling direction of the seat belt 3 through the belt guide hole (θ3=θb), which is different from the first embodiment. That is, the vehicle-front side ends 5b of the ribs 5 in the sixth embodiment extend in the traveling direction of the seat belt 3 through the belt guide hole, and the width of the rib 5 in the sixth embodiment is set so that it continuously changes. Therefore, the rib 5 formed in the sliding portion 4b2 is trapezoidal, as shown by broken lines in the figure. While the rib 5 in a sliding portion 4b1 shown in FIG. 7(a) is shaped like an inverted triangle, is may be shaped like an inverted trapezoid.

As shown in FIG. 7(b), all the vehicle-rear side ends 5a of the ribs 5 in the sixth embodiment are formed of a round portion having a small diameter R1 or of an edge portion, in a manner similar to that in the above first embodiment. All the vehicle-front side ends 5b of the projections 5 are formed of a round portion having a large diameter R2 or of a chamfered portion, in a manner similar to that in the above first embodiment. The vehicle-rear side ends 5a have operational effects substantially similar to those of the vehicle-rear side ends 5a in the first embodiment. Since the inclination angles θ3 and θb are set to be equal to each other, a reactive force for moving the seat belt 3 toward the vehicle front side does not act from the vehicle-front side ends 5b onto the seat belt 3 when the seat belt 3 is drawn during the operation of the EA mechanism. Moreover, a reactive force for moving the seat belt 3 toward the vehicle front side does not act because of the round portion having a large diameter R2, in a manner similar to that in the above first embodiment.

Since the reactive force for moving the seat belt 3 toward the vehicle front side does riot act from the vehicle-front side ends 5b onto the seat belt 3 when the seat belt 3 is drawn during the operation of the EA mechanism, the round portions at the vehicle-front side ends 5b may be formed of a round portion having a small diameter R1 or of an edge portion, depending on circumstances.

Other structural features and operational effects of the guide anchor 1 of the sixth embodiment are similar to those in the first embodiment. The guide anchor 1 of the sixth embodiment is suitable particularly for a seat belt device having a pretensioner, in a manner similar to that in the first embodiment.

FIGS. 8(a) and 8(b) show a guide anchor according to the seventh embodiment of the present invention. FIG. 8(a) is a partial view similar to FIG. 4(a), and FIG. 8(b) is a partially enlarged view of a section 8b in FIG. 8(a).

As shown in FIG. 8(a), in a guide anchor 1 of the seventh embodiment, a predetermined number of concave grooves 6, which are inclined in a manner similar to that of the ribs 5 in the sixth embodiment shown in FIGS. 7(a) and 7(b), are formed in a seat-belt sliding portion 4b, instead of the ribs 5. In this case, the inclination angle θ1 of vehicle-rear side ends 4b'a of seat-belt sliding portions 4b' forming the concave grooves 6 with respect to the vertical direction in the figure is set to be larger than the inclination angle θb of the traveling direction of the seat belt 3. The inclination angle θ3 of vehicle-front side end 4b'b of the seat-belt sliding portion 4b' forming the concave groove 6 with respect to the vertical direction in the figure is set to be equal to the inclination angle θb of the traveling direction of the seat belt 3 (θ3=θb).

As shown in FIG. 8(b), the vehicle-rear side end 4b'a of the seat-belt sliding portion 4b' forming the concave groove 6 is formed of a round portion having a small diameter RI or of an edge portion, in a manner similar to that of the vehicle-rear side end 5a of the rib 5 in the above first embodiment. The vehicle-front side end 4b'b of the seat-belt sliding portion 4b' forming the concave groove 6 is formed of a round portion having a large diameter R2, or of a chamfered portion in a manner similar to that in the first embodiment.

Other structural features of the guide anchor 1 of the seventh embodiment are the same as those in the first embodiment, and operational effects of the guide anchor 1 of the seventh embodiment are substantially the same as those of the sixth embodiment.

Figures 9A, 9B:
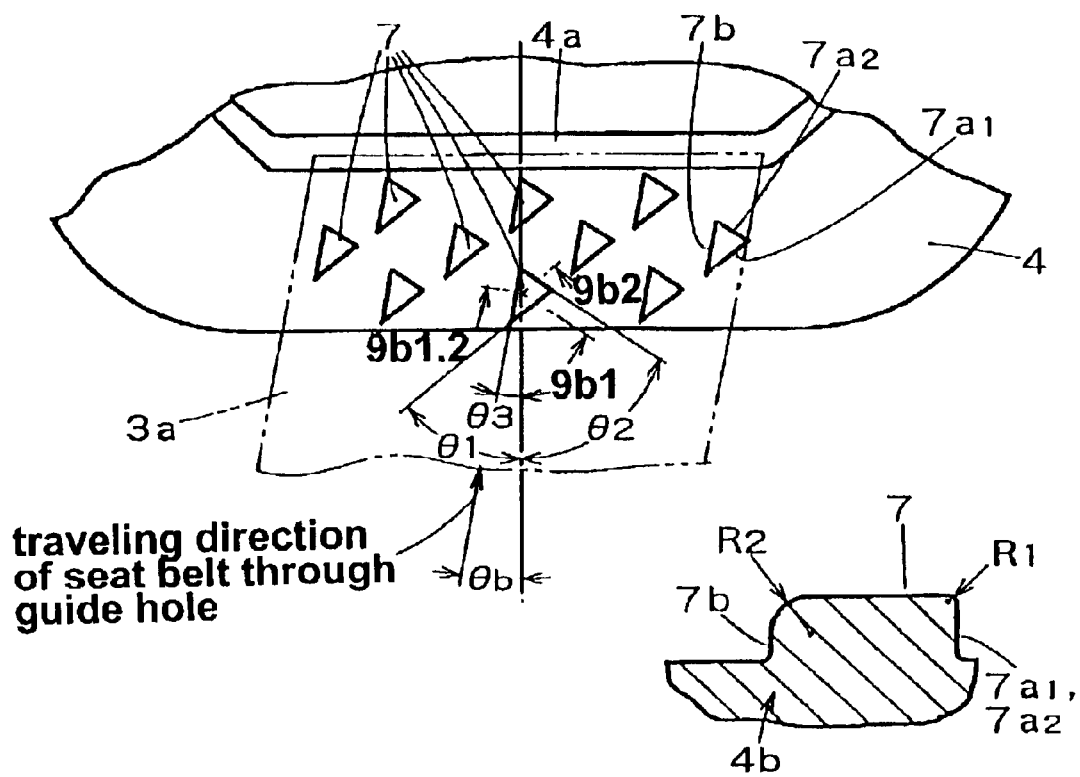

FIGS. 9(a) and 9(b) show a guide anchor according to the eighth embodiment of the present invention. FIG. 9(a) is a partial view similar to FIG. 4(a), and FIG. 9(b) is a partially enlarged view, taken along lines 9b1–9b1,2, which is the same as 9b2–9b1,2 in FIG. 9(a).

While the projections 7 of the guide anchor 1 of the fifth embodiment shown in FIG. 6(a) are shaped like a parallelogram, projection 7 in a guide anchor 1 of the eighth embodiment is shaped like a triangle, as shown in FIG. 9(a). In this case, vehicle-rear side ends 7a1 and 7a2 of the projection 7 in the eighth embodiment are similar to the vehicle-rear side ends 7a1 and 7a2 in the above fifth embodiment, and vehicle-front side end 7b of the projection 7 in the eighth embodiment is similar to the vehicle-front side end 7b of the above sixth embodiment shown in FIG. 7(a).

As shown in FIG. 9(b), the vehicle-rear side ends 7a1 and 7a2 of the projection 7 are formed of a round portion having a small diameter R1 or of an edge portion, in a manner similar to that in the first embodiment, and the vehicle-front side end 7b of the projection 7 is formed of a round portion having a large diameter R2, or of a chamfered portion in a manner similar to that in the first embodiment. The vehicle-rear side end 7a1 has operational effects substantially similar to those of the vehicle-rear side end 5a1 in the first embodiment. The vehicle-rear side end 7a2 has operational effects substantially similar to those of the vehicle-rear side end 5a1 in the second embodiment, and the vehicle-front side end 7b has operation-effects substantially similar to those of the vehicle-front side end 5b in the sixth embodiment. While FIG. 9(a) shows that the projections 7 are formed on the front side of a sliding portion 4b for the seat belt 3, the projections 7 are also formed on the rear side of the sliding portion 4b for the seat belt 3.

Other structural features of the guide anchor 1 of the eighth embodiment are similar to those in the first embodiment. Operational effects of the guide anchor 1 of the eighth embodiment correspond to a combination of those of the vehicle-rear side ends 7a1 and 7a2 of the projections 7 in the guide anchor of the fifth embodiment and those of the vehicle-front side ends 7*b* of the projections 7 of the guide anchor of the sixth embodiment. Therefore, the guide anchor 1 of the eighth embodiment is suitable for a seat belt device that has at least one of a pretensioner and an EA mechanism.

Figure 10A:
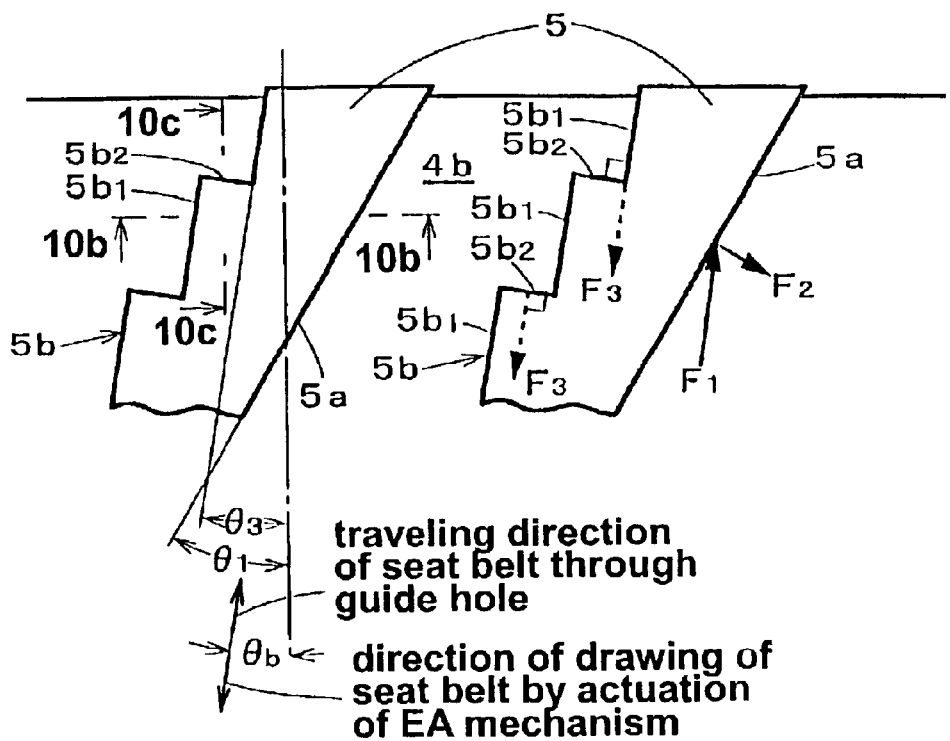
Figure 10B:
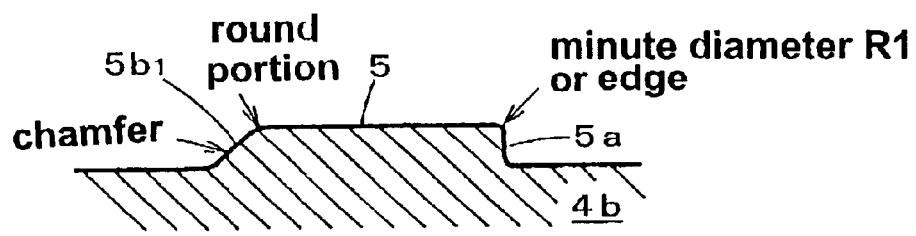
Figure 10C:
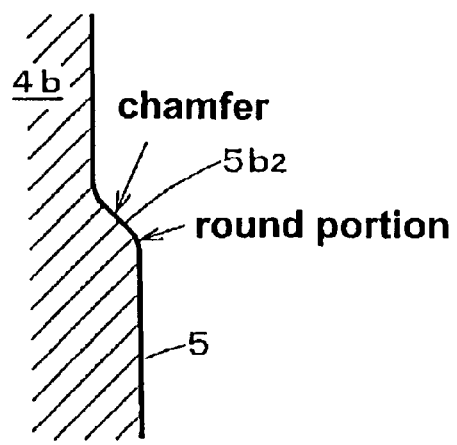

FIGS. 10(*a*), 10(*b*), and 10(*c*) show a guide anchor according to the ninth embodiment of the present invention. FIG. 10(*a*) is a partial view similar to FIGS. 2(*a*) and 2(*b*), FIG. 10(*b*) is a partially enlarged sectional view along line 10*b*—10*b* in FIG. 10(*a*), and FIG. 10(*c*) is a partially enlarged sectional view along line 10*c*—10*c* in FIG. 10(*a*).

While the vehicle-front side end 5*b* of the rib 5 is linearly formed in the sixth embodiment shown in FIG. 7, vehicle-front side end 5*b* of rib 5 in a guide anchor 1 of the ninth embodiment is formed in a stepped shape by a predetermined number of combinations of first vehicle-front side end portions 5*b*1 having the same inclination angle θ3 as that of the vehicle-front side ends 5*b* of the sixth embodiment and second vehicle-front side end portions 5*b*2 disposed at right angles to the first vehicle-front side end portions 5*b*1, as shown in FIG. 10(*a*). In this case, the relationship among the inclination angle θ1 of vehicle-rear side ends 5*a*, the inclination angle θ3 of the first vehicle-front side end portions 5*b*1, and the inclination angle of the traveling direction of a seat belt 3 through a belt guide hole, that is, the inclination angle θb of the drawing direction of the seat belt 3 by the EA mechanism (the drawing direction is opposite to the traveling direction through the belt guide hole) is set so that θ3 is equal to θb that is smaller than θ1, in a manner similar to that in the sixth embodiment. Therefore, the drawing direction of the seat belt 3 by the EA mechanism and the first vehicle-front side end portions 5*b*1 are parallel to each other, and the drawing direction of the seat belt 3 by the EA mechanism and the second vehicle-front side end portions 5*b*2 are perpendicular to each other.

As shown in FIGS. 10(*b*) and 10(*c*), the first and second vehicle-front side end portions 5*b*1 and 5*b*2 are chamfered, in a manner similar to that in the embodiment shown in FIG. 1(*c*), and the corners of the chamfers are round. Other structural features of the guide anchor 1 in the ninth embodiment are the same as those in the above sixth embodiment.

In the guide anchor 1 of the ninth embodiment having such a configuration, since the inclination angle θ3 of the first vehicle-front side end portion 5*b*1 and the inclination angle θb of the drawing direction of the seat belt 3 by the EA mechanism are set to be equal during the EA operation, a force F3 that the seat belt 3 exerts on the vehicle-front side ends 5*b* of the ribs 5 is rarely produced when the seat belt 3 is drawn in the operating state of the EA mechanism, in a manner similar to that in the above-described embodiments. Therefore, a reactive force F4 that moves the seat belt 3 toward the vehicle front side does not act from the vehicle-front side ends 5*b* onto the seat belt 3, and a reactive force that moves the seat belt 3 toward the vehicle front side does not act because of the chamfered and round portions, in a manner similar to that in the above first embodiment.

If the seat belt 3 exerts a force F3 on the vehicle-front side ends 5*b* of the ribs 5, since the drawing direction of the seat belt 3 by the EA mechanism and the first vehicle-front side end portions 5*b*1 are parallel to each other, and the drawing direction and the second vehicle-front side end portions 5*b*2 are perpendicular to each other, a component in the force F3 orthogonal to the first vehicle-front side end portions 5*b*1 is not produced. That is, a force for turning the guide anchor is not produced by the force F3, or the force F3 produces a little force. Consequently, the guide anchor will not turn. Other operational effects of the guide anchor 1 of the ninth embodiment are the same as those in the above sixth embodiment.

The vehicle-front side ends 5*b* in the guide anchor 1 of the ninth embodiment may be provided with a large diameter R2, as shown in FIG. 1(*b*), instead of being chamfered. While the vehicle-front side ends 5*b* need not always be chamfered or have a large diameter R2 in the ninth embodiment, it is preferable to provide such chamfering or a large diameter R2 in order to reliably achieve the operational effects The guide anchor 1 of the ninth embodiment is suitable particularly for a seat belt device having a pretensioner similar to the sixth embodiment.

Figure 11A:
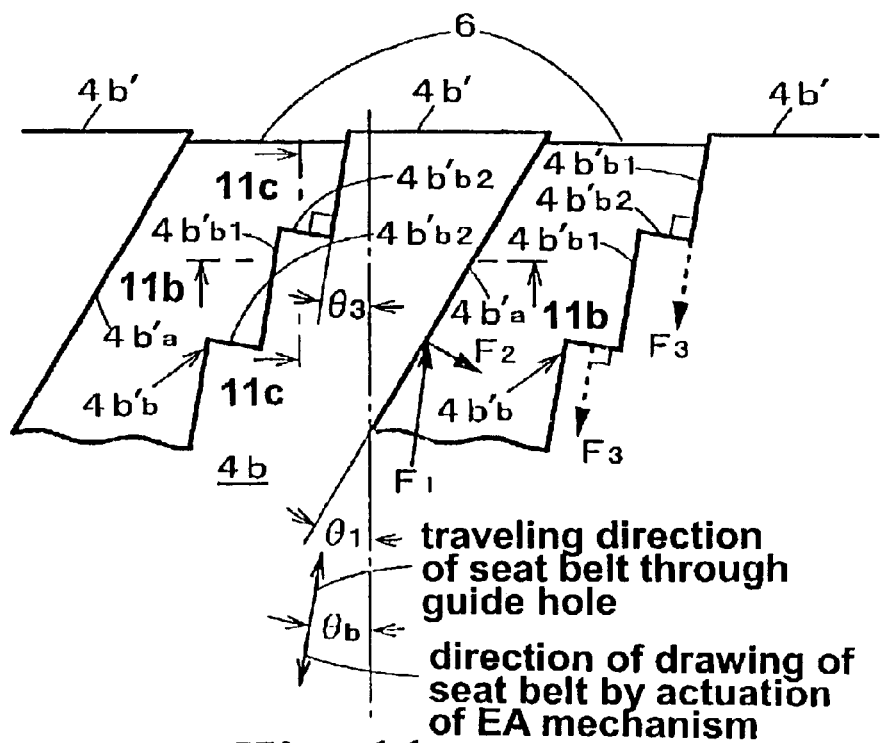
Figure 11B:
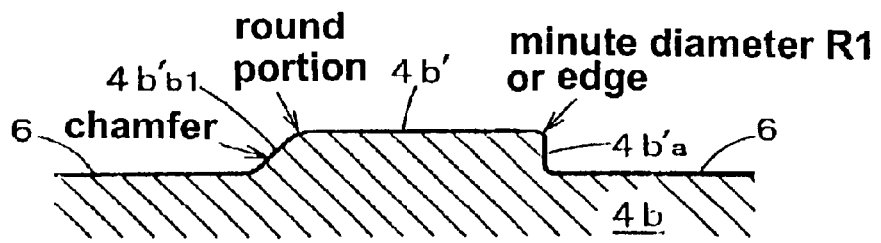
Figure 11C:
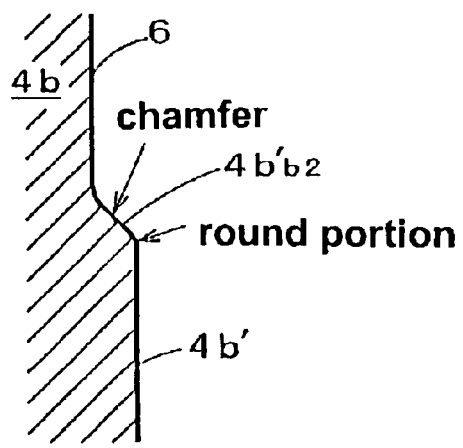
Figure 12:
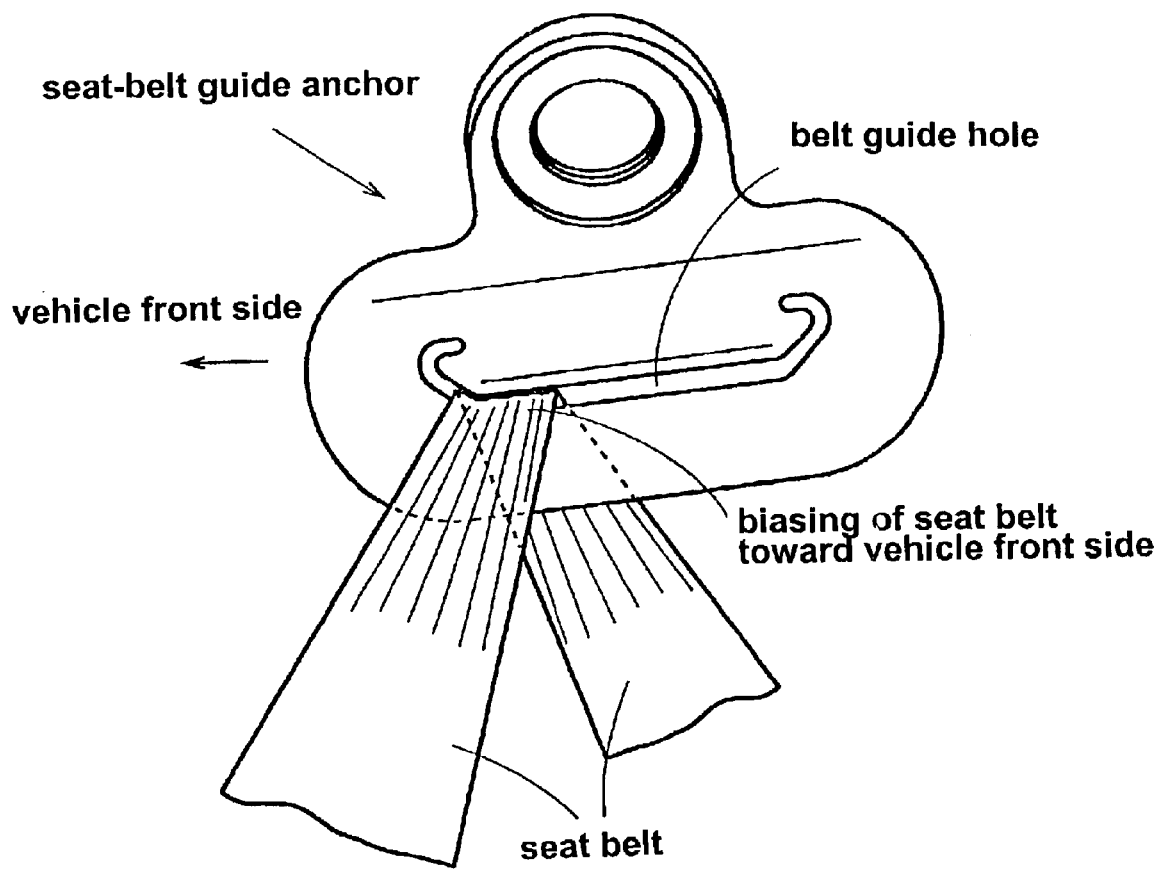
FIG. 12 is a view showing an operation of a conventional seat-belt guide anchor.

FIGS. 11(*a*), 11(*b*), and 11(*c*) show a guide anchor according to the tenth embodiment of the present invention. FIG. 11(*a*) is a partial view similar to FIGS. 2(*a*) and 2(*b*). FIG. 11(*b*) is a partially enlarged sectional view along line 11*b*—11*b* in FIG. 11(*a*), and FIG. 11(*c*) is a partially enlarged sectional view along line 11*c*—11*c* in FIG. 11(*a*).

While the vehicle-front side end 4*b'b* of the concave groove 6 is linearly formed in the seventh embodiment shown in FIGS. 8(*a*) and 8(*b*), vehicle-front side end 4*b'b* of concave grooves 6 in a guide anchor 1 of the tenth embodiment is formed in a stepped shape by a predetermined number of combinations of first vehicle-front side end portions 4*b'b*1 having the same inclination angle θ3 as that of the vehicle-front side ends 4*b'b* of the eighth embodiment and second vehicle-front side end portions 4*b'b*2 disposed perpendicular to the first vehicle-front side end portions 4*b'b*1, as shown in FIG. 11(*a*). In this case, the relationship among the inclination angle θ1 of the vehicle-rear side ends 4*b'a*, the inclination angle θ3 of the first vehicle-front side end portions 4*b'b*1, and the inclination angle of the traveling direction of a seat belt 3 through a belt guide hole, that is, the inclination angle θb of the drawing direction of the seat belt 3 by the EA mechanism (the drawing direction is opposite to the traveling direction through the belt guide hole) is set so that θ3 is equal to θb smaller than θ1, in a manner similar to that in the seventh embodiment. Therefore, the drawing direction of the seat belt 3 by the EA mechanism and the first vehicle-front side end portions 4*b'b*1 are parallel to each other, and the drawing direction of the seat belt 3 by the EA mechanism and the second vehicle-front side end portions 4*bb*2 are perpendicular to each other.

As shown in FIGS. 11(*b*) and 11(*c*), the first and second vehicle-front side end portions 4*b'b*1 and 4*b'b*2 are chamfered, in a manner similar to that in the embodiment shown in FIG. 1(*c*), and the corners of the chamfers are round. Other structural features of the guide anchor 1 of the tenth embodiment are the same as those in the above eighth embodiment.

In the guide anchor 1 of the tenth embodiment having such a configuration, since the inclination angle θ3 of the first vehicle-front side end portions 4*b'b*1 and the inclination angle θb of the drawing direction of the seat belt 3 by the EA mechanism are set to be equal during the EA operation, a force F3 that the seat belt 3 exerts on the vehicle-front side ends 4*b'b* of the concave grooves 6 is rarely produced when the seat belt 3 is drawn in the operating state of the EA mechanism, in a manner similar to that in the previous embodiments. Therefore, a reactive force F4 that moves the seat belt 3 toward the vehicle front side does not act from the vehicle-front side ends 4*b'b* onto the seat belt 3, and a reactive force that moves the seat belt 3 toward the vehicle front side does not act because of the chamfered and round portions, in a manner similar to that in the first embodiment.

If the seat belt 3 exerts a force F3 on the vehicle-front side ends 4*b'b* of the concave grooves 6, since the drawing direction of the seat belt 3 by the EA mechanism and the first vehicle-front side end portions 4b'b1 are parallel to each other, and the drawing direction and the second vehicle-front side end portions 4b'b2 are perpendicular to each other, a component in the force F3 orthogonal to the first vehicle-front side end portions 4b'b1 is not produced. That is, a force for turning the guide anchor is not produced by the force F3, or the force F3 produces a little force. Consequently, the guide anchor will not turn. Other operational effects of the guide anchor 1 of the tenth embodiment are the same as those in the above eighth embodiment.

The vehicle-front side ends 4b'b in the guide anchor 1 of the tenth embodiment may be provided with a large diameter R2, as shown in FIG. 1(b), instead of being chamfered. While the vehicle-front side end portions 4b'b need not always be chamfered or have a large diameter R2 in the tenth embodiment, it is preferable to provide such chamfering or a large diameter R2 in order to reliably achieve the operational effects. The guide anchor 1 of the tenth embodiment is suitable particularly for a seat belt device having a pretensioner, in a manner similar to that in the eighth embodiment.

As is evident from the above description, in the seatbelt guide anchor of the first aspect of the invention, when the seat belt is rapidly wound, for example, in response to the actuation of a pretensioner in the case of an emergency such as a vehicle collision, the movement of the seat belt toward the vehicle front side is inhibited by the vehicle-rear side end of the projection or the vehicle-rear side end of the seat-belt sliding portion forming the recess. This makes it possible to more effectively and reliably prevent the seat belt from being biased toward the vehicle front side. In particular, the first aspect of the invention can optimally prevent the seat belt from being biased in a seat-belt guide anchor of a seat belt device having a pretensioner.

In the second aspect of the invention, when the seat belt is drawn while absorbing the impact energy, for example, in response to the actuation of the EA mechanism in the case of an emergency such as a vehicle collision, the movement of the seat belt toward the vehicle front side is inhibited by the vehicle-rear side end projections or the vehicle-rear side end of the seat-belt sliding portion forming the recess. This makes it possible to more effectively and reliably prevent the seat belt from being biased toward the vehicle front side. In particular, the second aspect of the invention can optimally prevent the seat belt from being biased in the seat-belt guide anchor of the seat belt device without a pretensioner, but with an EA mechanism.

Further, in the third aspect of the invention, since the projection is shaped like a rib or the recess is shaped like a concave groove, the structure is simplified, and production is facilitated.

In the fourth aspect of invention, when the seat belt is rapidly wound, for example, in response to the actuation of the pretensioner in the case of an emergency such as a vehicle collision, the movement of the seat belt toward the vehicle front side is inhibited by the first vehicle-rear side end projections or the first vehicle-rear side ends of the seat-belt sliding portions forming the recesses. Furthermore, when the seat belt is drawn while absorbing impact energy, for example, in response to the actuation of the EA mechanism in the case of an emergency such as a vehicle collision, the movement of the seat belt toward the vehicle front side is inhibited by the second vehicle-rear side end projections or the second vehicle-rear side ends of the seat-belt sliding portions forming the recesses. This makes it possible to more effectively and reliably prevent the seat belt from being biased toward the vehicle front side. In particular, the fourth aspect of the invention can optimally prevent the seat belt from being biased in the seat-belt guide anchor of the seat belt device with at least one of the pretensioner and the EA mechanism.

In the fifth aspect of the invention, since the vehicle-rear side end projection or the vehicle-rear side end of the sliding portion forming the recess is formed of a round portion having a minute diameter or of an edge portion, the movement of the seat belt toward the vehicle front side is more effectively inhibited by a reactive force produced from the vehicle-rear side end by the friction between the vehicle-rear side end and the seat belt.

In the sixth aspect of the invention, since the vehicle-front side end projection or the vehicle-front side end of the sliding portion forming the recess is formed of a round portion having a large diameter, little friction occurs between the vehicle-front side end and the seat belt, and the movement of the seat belt toward the vehicle front side due to the vehicle-front side end is inhibited more effectively.

In the seventh aspect of the invention, since the vehicle-front side end projection or the vehicle-front side end of the sliding portion forming the recess extends in the traveling direction of the seat belt through the belt guide hole, little friction occurs between the vehicle-front side end and the seat belt, and the movement of the seat belt toward the vehicle front side due to the vehicle-front side end is inhibited more effectively.

In the eighth aspect of the invention, since the vehicle-front side end projection or the vehicle-front side end of the sliding portion forming the recess is formed in a stepped shape by a predetermined number of combinations of first vehicle-front side end portions parallel to the traveling direction of the seat belt through the belt guide hole and second vehicle-front side end portions perpendicular to the first vehicle-front side end portions, when the seat belt is drawn, the turning of the guide anchor is inhibited, and the movement of the seat belt toward the vehicle front side is inhibited.

While the invention has been explained with reference to the specific embodiments of the invention, the explanation is illustrative and the invention is limited only by the appended claims.

What is claimed is:

1. A seat-belt guide anchor for guiding a seat belt in a vehicle, comprising, a main body having an elongated guide hole through which the seat belt slides with a first angle relative to a direction perpendicular to a longitudinal direction of the guide hole; and a sliding portion formed on the main body adjacent to the guide hole for contacting the seat belt and having a plurality of projections or recesses arranged adjacent to each other, each of said projections or recesses having a front end portion and a rear end portion forming each of the projections or recesses relative to a longitudinal direction of the vehicle, said front end portion having an edge portion with an edge angle greater than that at the rear end portion, or a chamfered portion to reduce friction between the front end portion and the seat belt, and said rear end portion being inclined with a second angle relative to the direction perpendicular to the longitudinal direction of the guide hole such that said second angle is different from the first angle to provide a friction between the rear end portion and the seat belt to thereby restrict a movement of the seat belt in the longitudinal direction of the guide hole.

2. The seat-belt guide anchor according to claim 1, wherein said second angle is set to be greater than the first angle.

3. The seat-belt guide anchor according to claim 1, wherein said second angle is set to be smaller than the first angle.

4. The seat-belt guide anchor according to claim 1, wherein said second angle is set to be opposite to the first angle relative to the direction perpendicular to the longitudinal direction of the guide hole.

5. The seat-belt guide anchor according to claim 1, wherein each of said projections has a rib shape.

6. The seat-belt guide anchor according to claim 1, wherein each of said recesses has a concave groove shape.

7. The seat-belt guide anchor according to claim 1, wherein said sliding portion includes a large number of the projections or recesses, the rear end portion of each of the projections or recesses being formed of first and second side edges, said first side edge inclining with a third angle relative to the direction perpendicular to the longitudinal direction of the guide hole, said second side edge inclining with a fourth angle relative to the direction perpendicular to the longitudinal direction of the guide hole, said third angle being set to be larger than the first angle, and said fourth angle being set to be smaller than the first angle.

8. The seat-belt guide anchor according to claim 7, wherein said fourth angle is set to be opposite to the first angle relative to the direction perpendicular to the longitudinal direction of the guide hole.

9. The seat-belt guide anchor according to claim 1, wherein said rear end portion has an edge portion.

10. The seat-belt guide anchor according to claim 1, wherein said front end portion is inclined substantially parallel to the first angle.

11. The seat-belt guide anchor according to claim 1, wherein said front end portion includes a step portion formed of first portions parallel to the longitudinal direction of the guide hole and second portions perpendicular to the first portions.

12. The seat-belt guide anchor according to claim 1, wherein said sliding portion includes a front side facing an interior of the vehicle and a rear side opposite to the front side, said plurality of the projections or recesses extending from the front side to the rear side continuously through the guide hole.

* * * * *